United States Patent [19]

Elmy et al.

[11] 4,310,082
[45] Jan. 12, 1982

[54] VARIABLE SPEED DRIVE AND COMBINED CLUTCH/BRAKE SYSTEM

[75] Inventors: Raymond L. Elmy, Franklin; Joe Crabtree, Lewisburg; Aaron A. Stevens, Spring Hill; Randall K. Lawrence, Fairview, all of Tenn.

[73] Assignee: The Murray Ohio Manufacturing Co., Brentwood, Tenn.

[21] Appl. No.: 151,895

[22] Filed: May 21, 1980

[51] Int. Cl.³ ............................................. B60K 41/20
[52] U.S. Cl. ........................................ 192/11; 74/477
[58] Field of Search ............ 192/11, 4 A, 13 R, 17 R; 56/11.1, 11.3, 11.6, 11.7; 74/481, 504, 477; 474/25, 27, 33

[56] References Cited

U.S. PATENT DOCUMENTS

| | | | |
|---|---|---|---|
| 2,718,154 | 9/1955 | Mathson | 192/11 X |
| 3,145,584 | 8/1964 | Fairbank et al. | 56/11.1 X |
| 3,583,535 | 6/1971 | Plamper | 192/11 |

*Primary Examiner*—George H. Krizmanich
*Attorney, Agent, or Firm*—Cushman, Darby & Cushman

[57] ABSTRACT

A belt drive arrangement is provided which employs a variator to interconnect a drive belt operated by a power source and a driven belt which operates a wheel drive of a ground-engaging vehicle. The variator is mounted on a pivotally movable arm whereby the position of the variator is selectively altered to vary the speed of the driven belt and thus the ground speed of the vehicle. A single pedal is linked via cam means to the variator-supporting arm. Depression of the pedal pivots the arm to reduce drive belt tension until the driven belt no longer is moved and additional linkage is actuated to brake the wheels of the vehicle. An idler assembly is operatively related to the driven belt and is responsive to the force exerted by the driven belt to actuate the brakes when the vehicle's power source is turned off with the variator at a high speed setting. A hand-operated parking brake also is provided to brake the vehicle independently of the variator operation and depression of the pedal.

13 Claims, 3 Drawing Figures

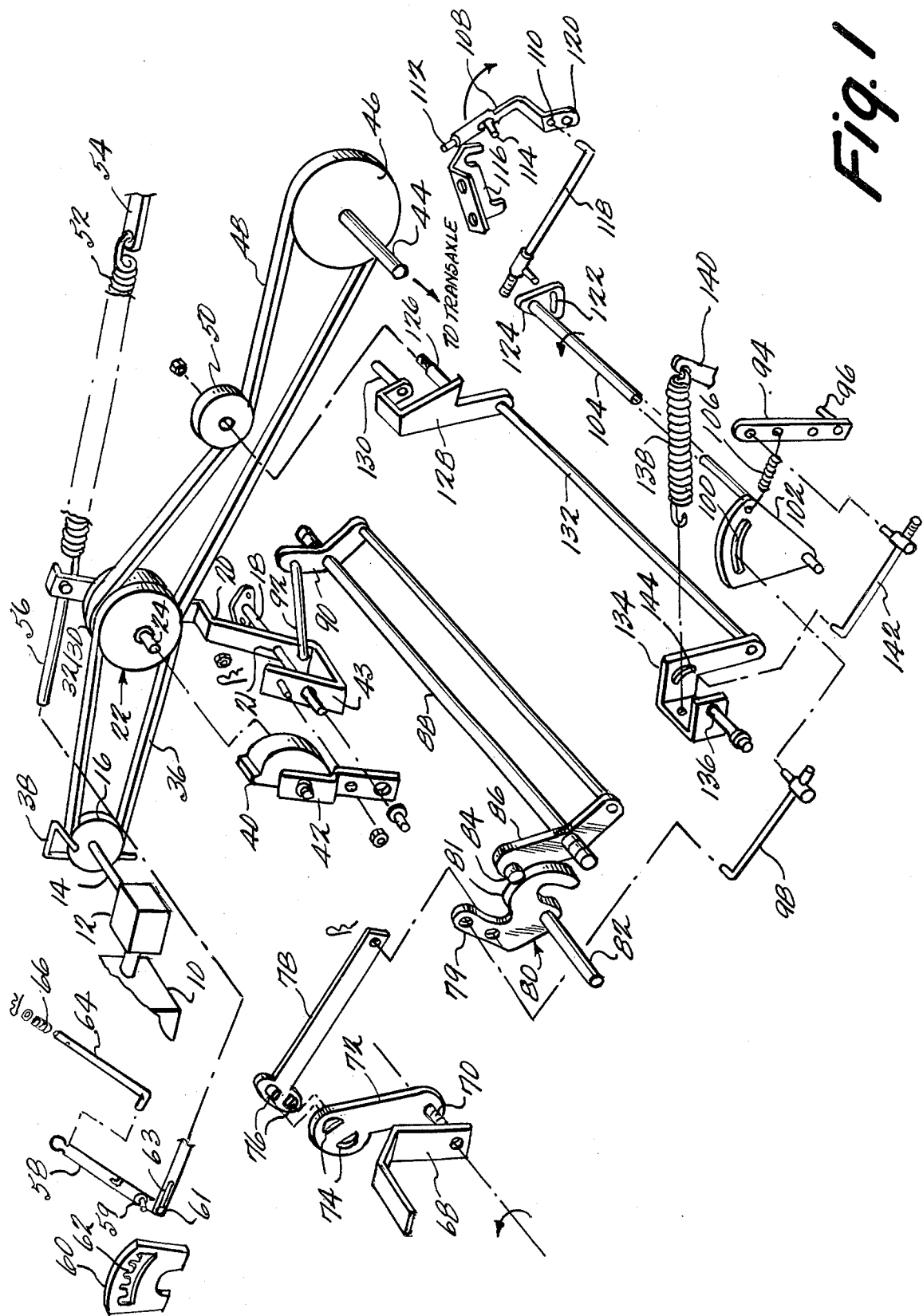

VARIABLE SPEED DRIVE AND COMBINED CLUTCH/BRAKE SYSTEM

BACKGROUND OF THE INVENTION

A conventional means of driving a vehicle, such as a rider-type lawnmower or small tractor, is to interconnect the output shaft of a gasoline engine to a belt drive for operating a transaxle or transmission which is joined to the drive wheels of a vehicle. Such an arrangement usually suffers one or more of the following shortcomings:

1. difficulty in adjusting the vehicle's ground speed in small increments;
2. the necessity of having separate clutch and brake mechanisms for interrupting the wheel drive and for stopping the vehicle; and
3. the problem of excessive acceleration when a clutch is disengaged with the belt drive set for high speed operation, or when the engine is started with the belt drive at its high speed setting.

SUMMARY OF THE INVENTION

Deficiencies of the type just enumerated are overcome by the variable speed drive and combined clutch-brake system which comprises the present invention. More particularly, a belt drive arrangement is provided wherein a first belt is joined between the output shaft of the vehicle's power source and a variator, and a second belt extends between the variator and the wheel drive. The variator is mounted on an arm which is pivotally movable so that the tautness of the belts can be varied. This permits the ground speed of the vehicle to be selectively altered in small increments. A single pedal is employed to displace a cam which has a follower linked to the variator-supporting arm such that as the pedal is depressed, the arm moves to cause increased slackening of the first belt until a point is reached at which the belt no longer operates the variator. Thus, the wheel drive is increasingly downshifted in speed as the pedal is depressed. Conversely, on release of the depressed pedal, a spring arrangement returns the variator to its normal position for the speed selected thereby gradually accelerating the wheel drive.

The pedal-operated cam also is connected to a braking arrangement for the vehicle's wheels in such a manner that when the pedal is sufficiently depressed in downshifting the speed of the vehicle, the vehicle's brakes are actuated.

Means also are provided for braking the wheels when the vehicle's power source is shut off with the variator in a high speed position and the pedal subsequently is depressed. This is accomplished by linkage connecting an idler pulley associated with the second belt to the braking arrangement. When engine shut-off occurs, the belts become static thereby disabling the variator. Subsequent depression of the pedal permits some movement of the variator arm. However, the pedal cannot be depressed sufficiently to cause the brake to be actuated. As the pedal is depressed to move the variator arm, the second belt becomes taut thereby displacing the idler and its associated linkage whereby the brake is actuated. The linkage connecting the idler to the braking arrangement is spring loaded.

A still further means for braking the vehicle is a parking brake which is operable independently of the variable speed belt drive and the clutch-brake arrangement.

The invention now will be described in greater detail with reference to the accompanying drawings wherein:

FIG. 1 is an exploded view of the variable speed drive and combined clutch-brake system according to the invention;

DETAILED DESCRIPTION OF THE INVENTION

Figure 3:
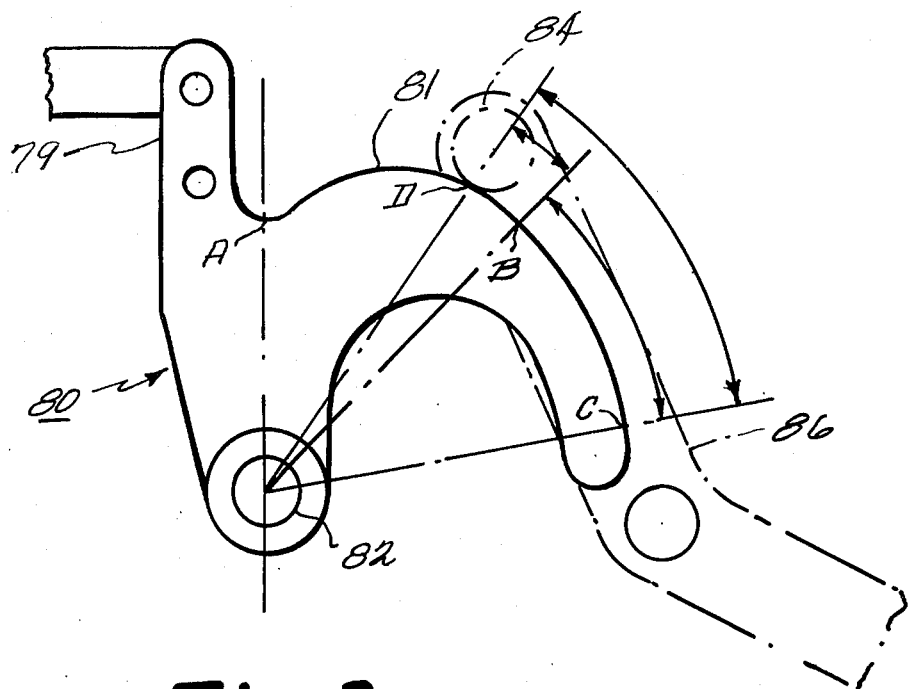
FIG. 3 is an elevational view of the cam element shown in FIG. 1.

Referring to FIG. 1, a mower engine is generally indicated by reference numeral 10, the engine being supported by a vehicle frame which, for convenience of illustration, is omitted from the drawings. The output shaft from engine 10 is joined to a gear box 12 provided with an output shaft 14 for driving a pulley 16.

Figure 2:
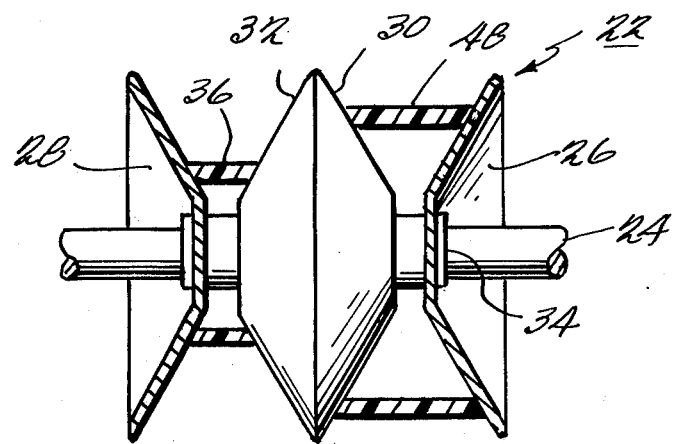
FIG. 2 is a sectional view of the variator shown in FIG. 1.

A projecting shaft 18 is rotatably mounted to the vehicle frame in parallel spaced relationship with respect to shaft 14. An arm 20 is secured to shaft 18 at 21. Intermediate point 21 the free end of the arm, a variator 22 is mounted on a shaft 24 projecting from arm 20. The variator 22 is illustrated in detail in FIG. 2 and is of conventional construction comprising a pair of frusto-conical disks 26 and 28 secured to shaft 24 at spaced points along the shaft. An additional pair of frusto-conical disks 30 and 32 are joined together in back-to-back relationship as an element mounted on a bearing 34 which extends between disks 26 and 28. The element formed by disks 30 and 32 is arranged so as to be slidably movable along the bearing 34. A first belt 36 extends around the periphery of pulley 16 and within a first portion of the variator 22 defined by disks 28 and 32. A belt guide 38 is joined to the vehicle frame adjacent pulley 16 to retain belt 36 in position relative to pulley 16. A semicircular belt guide 40 is secured to an end of an arm 42 which is joined at its opposite end to an L-shaped extension 43 of arm 20. Belt guide 40 retains belt 36 in position between disks 28 and 32 of the variator. Consequently, when engine 10 is running and belt 36 is sufficiently taut, rotation of pulley 16 is transmitted by belt 36 to cause rotation of the variator about shaft 24.

An additional shaft 44 is rotatably supported in parallel spaced relationship with respect to shafts 14 and 24 on the opposite side of shaft 24 from shaft 14. A further pulley 46 is secured to shaft 44 for rotation therewith, and a belt 48 is positioned around pulley 46 and the within disks 26 and 30 which form a second portion of the variator 22. When the belt 48 is tensioned by means of an idler 50, rotation of variator 22 results in belt 48 causing pulley 46 and shaft 44 to rotate. Shaft 44 is coupled to a conventional transaxle (not shown) which is mounted to the vehicle frame for driving the wheels of the vehicle. Thus, rotation of shaft 44 powers the vehicle.

The purpose of the variator is to permit the vehicle to be driven at a speed which is variable in small increments. This is accomplished by connecting the free end of arm 20, which supports variator 22, to a spring 52 which is joined at its opposite end to a mount 54 secured to the vehicle frame. The free end of arm 20 also is joined by a connecting link 56 to an end of a speed shifting lever 58 which is pivotally mounted to the vehicle frame about a projection 59 intermediate the ends of the lever. Consequently, displacement of lever 58 about projection 59 is translated by the connecting link 56 to cause arm 20 to be rotated with respect to shaft 18. The connection of link 56 to the end of shift lever 58 involves a projection 61 from lever 58 being located within a slot 63 at the end of link 56. The spring 52 normally retains projection 61 at the end of the slot, as indicated in FIG. 1. The condition which causes deviation from such a relationship between the projection and the slot will be described hereinafter.

The extent of movement of lever 58 is selectively controlled by a fixed plate 60 having an opening 62 with multiple notches for receiving the end of a spring-loaded locking element 64 which is telescoped within the lever 58 in conventional fashion. When an operator is desirous of changing the mower's speed of movement over the ground, the locking element 64 is displaced from the notch at which it has been set, and lever 58 is selectively moved to a different position. At that point, release of element 64 causes its associated spring 66 to move the end of the element into engagement with another one of the notches, thereby locking the variator-supporting arm 20 in a different position. Of course, a biasing force is exerted on the variator support arm 20 by spring 52 at all times.

As the arm 20 is displaced by actuation of the speed control lever 58, the resultant movement of variator 22 alters the tautness of the belt 36. This permits the assembly of disks 30 and 32 to be displaced along shaft 24 which in turn causes belt 48 to ride up or down within the space between disks 26 and 30. As viewed in FIG. 1, if the speed control lever 58 is moved so as to displace the variator towards the fixed pulley 46, the tautness of belt 36 increases, causing the displacement of the central disk assembly 30 and 32 towards disk 26. This effectively results in an increase in rotational speed of the variator which is translated via belt 48, pulley 46 and shaft 44 to the transaxle to increase the vehicle's ground speed. Conversely, movement of the speed control lever 58 in the opposite direction displaces the variator so as to reduce the tautness of belt 36. Consequently, the disk assembly 30 and 32 is displaced by the increased tautness of belt 48 towards disk 28 resulting in the lowering of the rotational speed of the variator and the transaxle. This causes a reduction in the speed of the vehicle.

The combined brake and clutch system associated with the variable speed drive now will be described. A single brake pedal 68 is secured to shaft 70 rotatably supported by the vehicle frame. One end of a connecting link 72 is secured to shaft 70. The opposite end of link 72 is provided with a pair of elongated D-shaped apertures 74 arranged to receive pins 76 projecting from one end of a further link 78. The apertures 74 are arranged to serve as cam slots for cooperating with pins 76 to accept braking loads at proper intervals in order to modify the mechanical advantage thereby spreading out the brake-clutch effort, which will be described hereinafter. The opposite end of link 78 is pivotally connected to an arm 79 extending from a cam element 80 (FIG. 3). The cam is joined to a shaft 82 which also is rotatably supported by the vehicle frame. Consequently, when the pedal 68 is depressed to rotate shaft 70 in a counterclockwise direction, as indicated by the arrow in FIG. 1, the connecting link 72 similarly rotates. This movement is translated by link 78 causing cam element 80 to rotate counterclockwise with respect to the axis of shaft 82. The camming surface 81 of element 80 (shown in detail in FIG. 3) is provided with a rest position at point A, the surface following an Archimedes spiral having a scalar varying according to a second order equation between points A and B followed by a continuous radius between points B and C. A cam follower 84 is arranged to engage the camming surface 81 of element 80. The follower 84 projects from one end of bellcrank 86 which, intermediate its ends, is secured to a shaft 88 rotatably supported by the vehicle frame. The opposite end of shaft 88 is similarly joined to the central portion of a further bellcrank 90 having a free end thereof joined to arm 20 by a connecting link 92 pivotally secured to the bellcrank. The link 92 is pivotally secured to arm 20 at a point on the opposite end of the arm from that to which spring 52 is secured. The arrangement of link 92 and bellcrank 90 is such as to cause the cam follower 84 to rest against the camming surface 81 of cam element 80.

When the pedal 68 is depressed to move the cam follower from the rest position A towards point B on the camming surface, shaft 88 is rotated clockwise about its axis, as viewed in FIGS. 1 and 3. By means of bellcrank 90 and link 92, this movement is translated into rotation of arm 20 counter-clockwise about the axis of shaft 18, thereby displacing the variator to reduce the tautness of belt 36. Such counter-clockwise movement of arm 20, permitted by the slot 63 in connecting link 56, results in the ground speed of the vehicle being decreased in the manner previously described. Depression of pedal 68 sufficiently to cause cam follower 84 to reach point B on camming surface 81 produces reduced tautness in belt 36 of such degree that the rotation of pulley 16 cannot be transmitted by the belt to the variator, and the power transmission to the transaxle is interrupted.

With an arrangement as just described, the release of pedal 68 causes a gradual increase in the tautness of belt 36 due to the action of spring 52 in returning the variator to its set position. Consequently, there is a moderate acceleration of the vehicle even when the speed control lever 58 is in the high speed position. This characteristic of the invention constitutes an important safety feature. The gradual acceleration increases until a speed is reached corresponding to the setting of speed control lever 58.

The invention also is provided with a braking arrangement. More particularly, an arm 94 is pivotally connected to the frame of the vehicle by a shaft 96. At a point intermediate its ends, the arm 94 is connected to a conventional band or disk brake (not shown) for stopping the movement of the vehicle. By selectively actuating arm 94 adjacent its end so as to pivot it about the axis of shaft 96, the brake is actuated.

Braking is initiated in a variety of ways. The first to be described is the brake control afforded by the actuation of pedal 68. The structure employed for this purpose is an adjustable connecting link 98 which is joined at one of its ends to the projecting arm 79 of the cam element 80. The opposite end of link 98 is positioned within a slot 100 provided in a plate 102 which is pivotally joined to the vehicle frame by means of a shaft 104 to which plate 102 is secured. A spring 106 is connected at its opposite ends to plate 102 and to a point near an end of the arm 94. The point where the arm 94 is joined to the brake is intermediate the connection points of the spring 106 and the shaft 96 to the arm. As pedal 68 is depressed, the end of the connecting link 98 associated with plate 102 moves along slot 100. When the cam element 80 has rotated to the degree that cam follower 84 reaches a point D (FIG. 3) along the camming surface 81, the end of link 98 within slot 100 engages the end of the slot. It should be noted that at this point there is an overlap in the clutching and braking functions when the cam follower 84 is located between points D and B on the camming surface 81. Further depression of pedal 68, whereby follower 84 moves to point C (FIG. 3), results in plate 102 being rotated counterclockwise about shaft 104 as viewed in FIG. 1. This movement in turn is translated by spring 106 to arm 94 causing the latter also to rotate counterclockwise about its shaft 96 to actuate the brake. On release of the pedal 68, the end of link 98 moves to engage the opposite end of slot 100 to return the plate 102 to its original position. The relaxation of spring 106 thereby permits the arm 94 to return to a nonbraking position.

The system also includes a hand-operated parking brake which is conveniently mounted to the vehicle frame or on the operator'seat support. The parking brake comprises a handle 108 pivotally mounted, in the manner just mentioned, about a point 120. Handle 108 is provided with a spring-loaded locking element 112 similar to that utilized with handle 58. The element 112 includes a projection 114 which cooperates with an indexing plate 116 which is also fixed to the frame or the seat support. A connecting link 118 of adjustable length is pivotally joined at one of its ends to the handle 108 at a location 110 which is intermediate pivot 120 and the opposite end of the handle 108. The opposite end of link 118 is located in a slot 122 provided in a plate 124 which also is secured to shaft 104. When handle 108 is rotated clockwise (as viewed in FIG. 1), the end of connecting link 118 moves within slot 122 until it reaches an end thereof. Further displacement of link 118 causes counterclockwise rotation of shaft 104 which is translated by plate 102 and spring 106 resulting in the actuation of arm 94 to cause the brakes to function. The brakes remain locked until the handle 108 is returned to its initial position to cause clockwise rotation of shaft 104 and release of the braking force applied to arm 94 by spring 106.

Braking additionally is achieved when the speed selector lever is set at a high speed position and the engine of the vehicle is shut off before the pedal 68 is depressed sufficiently to cause braking. Under these conditions, the disk assembly 30 and 32 cannot be displaced along shaft 24 since belts 36 and 48 are static. Consequently, the amount of pedal depression is limited to that permitted by the slack existing in belt 48, and this amount is insufficient to permit actuation of the brakes via connecting link 98.

Braking in this circumstance is accomplished through an idler arm assembly for the belt idler 50. More particularly, idler 50 is rotatably mounted on a shaft 126 projecting from a an arm 128 pivotally connected to the mower frame by a shaft 130 which also is secured to arm 128. A shaft 132 rigidly connects arm 128 to an additional bracket 134 also pivotally secured to the mower frame by a shaft 136 projecting from arm 134. A spring 138 is connected between arm 134 and a mounting 140 fixed to the frame. The orientation of spring 138 is such that the idler assembly is biased to rotate clockwise about the common axis of shafts 136 and 130 as they are viewed in FIG. 1. As a result, the idler 50 is urged against belt 48 in order to deflect the belt to take up any slack therein. A further connecting link 142 of adjustable length extends between arm 94 and arm 134. More particularly, one end of link 142 is positioned within a slot 144 provided in the arm while the opposite end of the link is pivotally connected to arm 94 adjacent the connection of spring 106 to the arm. During normal operation when the engine is running, the force of spring 138 is such as to prevent the end of link 142 from engaging the end of slot 144. However, when the engine is stopped with the gear selection lever positioned at high speed, the limited depression of pedal removes the slack in belt 48 thereby lifting the idler 50 in opposition to the biasing of spring 138. The resultant movement of the idler assembly in a counterclockwise direction with respect to the common axis of shafts 130 and 136 results in link 142 engaging the end of slot 114 whereby arm 94 is displaced to actuate the brakes.

What is claimed is:

1. A variable speed drive and combined clutch/brake actuating system for a ground-engaging vehicle having an engine power source, said system comprising:
    a drive pulley connected to an output shaft of said power source;
    an arm pivotally supported by said vehicle;
    a variator rotatably supported adjacent an end of said arm, said variator including first and second belt-receiving portions separated by an element movable along the axis of rotation of the variator for varying the widths of said portions in response to the relative tautness of belts received in said portions;
    an additional pulley operatively connected to a shaft for powering said vehicle;
    a first belt operatively related to the drive pulley and received in the first belt-receiving portion of said variator;
    a second belt received in the second belt-receiving portion of the variator and operatively related to the additional pulley;
    spring means joined to said arm for biasing said arm in a direction tending to increase the tautness of said first belt;
    a selectively adjustable speed control lever;
    linkage means connected between said arm and the speed control lever, said lever and linkage means being operable to adjustably limit movement of said arm in response to the biasing of said spring means;
    a pedal;
    a cam element connected to said pedal and including a camming surface thereon;
    a cam follower for engaging said camming surface;
    means operatively connecting said cam follower to said arm whereby when said pedal is depressed to displace the camming surface with respect to the cam follower, said arm is pivoted to move in opposition to the biasing of the spring means thereby tending to decrease the tautness of said first belt; and
    a brake-actuating arm connected to said cam element and displaced in response to further depression of the pedal for braking said vehicle.

2. A system as set forth in claim 1 further comprising:
    an idler pulley operatively related to the second belt; and
    means for biasing said pulley against the second belt.

3. A system as set forth in claim 2, wherein said pulley biasing means comprises:
    an idler support assembly pivotally joined to said vehicle and carrying said idler pulley;
    additional spring means connected to the support assembly for biasing the assembly in a direction about its pivotal axis to bring the idler pulley into contact with the second belt; and wherein said system further comprises:

means joining said idler support assembly to said brake-actuating arm, said means being responsive to movement of the support assembly in a direction about its pivotal axis opposite to that in which it is urged by said additional spring means to thereby displace the brake-actuating arm.

4. A system as set forth in claim 1, wherein said camming surface comprises first and second portions, said first camming surface portion following a varying radius and said second camming surface portion following a continuous radius, said cam follower engaging the first camming surface portion as the arm is pivoted in opposition to the biasing of the spring means and engaging the second camming surface portion during displacement of the brake-actuating arm in response to pedal depression.

5. A system according to claim 4, wherein the varying radius of said first camming surface portion is an Archimedes spiral having a scalar varying according to a second order equation.

6. A system as set forth in claim 1, wherein means connecting the cam element to the brake-actuating arm comprises a plate pivotally connected to said vehicle and joined to the brake-actuating arm, and a connecting link extending between said cam element and the plate, at least one of the cam element and plate being slotted to receive an end of the conncting link whereby during said further depression of the pedal the end of said connecting link engages an end of the slot to pivot the plate and displace the brake-actuating arm.

7. A variable speed drive and combined clutch/brake actuating system for a ground-engaging vehicle having an engine power source, said system comprising:
a drive pulley connected to an output shaft of said power source;
an arm pivotally supported by said vehicle at a location intermediate the ends of said arm;
a variator rotatably supported by said arm adjacent one of its ends, said variator including first and second belt-receiving portions separated by an element movable along the axis of rotation of the variator for varying the widths of said portions in response to the relative tautness of belts received in said portions;
an additional pulley operatively connected to a shaft for powering said vehicle;
a first belt operatively related to the drive pulley and received in the first belt-receiving portion of said variator;
a second belt received in the second belt-receiving portion of the variator and operatively related to the additional pulley;
spring means joined to the arm adjacent said one end for biasing said arm in a direction tending to increase the tautness of said first belt;
a selectively adjustable speed control lever;
linkage means connected between said one end of the arm and the speed control lever, said lever and linkage means being operable to adjustably limit movement of said arm in response to the biasing of said spring means;
a pedal;
a cam element connected to said pedal and including a camming surface thereon, said camming surface including first and second portions, said first camming surface portion following a varying radius and said second camming surface portion following a continuous radius;
a cam follower for engaging said camming surface;
means operatively connecting said cam follower to the opposite end of said arm whereby when said pedal is depressed to displace the first portion of the camming surface with respect to the cam follower, said arm is pivoted to move in opposition to the biasing of the spring means thereby tending to decrease the tautness of said first belt; and
a brake-actuating arm connected to said cam element whereby when said pedal is further depressed to displace the second portion of the camming surface with respect to the cam follower, said brake-actuating arm is displaced for braking said vehicle.

8. A system according to claim 7 wherein the varying radius of said first camming surface portion is an Archimedes spiral having a scalar varying according to a second order equation.

9. A system as set forth in claim 8 further comprising:
an idler pulley operatively related to the second belt; and
means for biasing said pulley against the second belt.

10. A system as set forth in claim 9, wherein said pulley biasing means comprises:
an idler support assembly pivotally joined to said vehicle and carrying said idler pulley;
additional spring means connected to the support assembly for biasing the assembly in a direction about its pivotal axis to bring the idler pulley into contact with the second belt; and wherein said system further comprises:
means joining an idler support assembly to said brake-actuating arm, said means being responsive to movement of the support assembly in a direction about its pivotal axis opposite to that in which it is urged by said additional spring means to thereby displace the brake-actuating arm.

11. A system as set forth in claim 7, wherein the means connecting the cam element to the brake-actuating arm comprises a plate pivotally connected to said vehicle and joined to the brake-actuating arm, and a connecting link extending between said cam element and the plate, at least one of the cam element and plate being slotted to receive an end of the connecting link whereby during said further depression of the pedal the end of the connecting link engages an end of the slot to pivot the plate and displace the brake-actuating arm.

12. A variable speed drive and combined clutch/brake actuating system for a ground-engaging vehicle having an engine power source, said system comprising:
a drive pulley connected to an output shaft of said power source;
an arm pivotally supported by said vehicle at a location intermediate the ends of said arm;
a variator rotatably supported by said arm adjacent one of its ends, said variator including first and second belt-receiving portions separated by an element movable along the axis of rotation of the variator for varying the widths of said portions in response to the relative tautness of belts received in said portions;
an additional pulley operatively connected to a shaft for powering said vehicle;
a first belt operatively related to the drive pulley and received in the first belt-receiving portion of said variator;

a second belt received in the second belt-receiving portion of the variator and operatively related to the additional pulley;

spring means joined to the arm adjacent said one end for biasing said arm in a direction tending to increase the tautness of said first belt;

a selectively adjustable speed control lever;

linkage means connected between said one end of the arm and the speed control lever, said lever and linkage means being operable to adjustably limit movement of said arm in response to the biasing of said spring means;

a pedal;

a cam element connected to said pedal and including a camming surface thereon, said camming surface including first and second camming surface portions, said first camming surface following a varying radius and said second camming surface portion following a continuous radius;

a cam follower for engaging said camming surface;

means operatively connecting said cam follower to the opposite end of said arm whereby when said pedal is depressed to displace the first portion of the camming surface with respect to the cam follower, said arm is pivoted to move in opposition to the biasing of the spring means thereby tending to decrease the tautness of said first belt;

a plate pivotally connected to said vehicle and joined to a brake-actuating arm;

a connecting link extending between said cam element and the plate, at least one of the cam element and plate being slotted to receive an end of the connecting link whereby when said pedal is further depressed to displace the second portion of the camming surface with respect to the cam follower, the end of the connecting link engages an end of the slot to pivot the plate and displace the brake-actuating arm for braking said vehicle;

an idler pulley operatively related to the second belt;

an idler support assembly pivotally joined to said vehicle and carrying said idler pulley;

additional spring means connected to the support assembly for biasing the assembly in a direction about its pivotal axis to bring the idler pulley into contact with the second belt; and means joining said idler support assembly to said brake-actuating arm, said means being responsive to movement of the support assembly in a direction about its pivotal axis opposite to that in which it is urged by said additional spring means to thereby displace the brake-actuating arm.

13. A system as set forth in claim 12, wherein the varying radius of said first camming surface portion is an Archimedes spiral having a scalar varying according to a second order equation.

* * * * *